US009263166B2

(12) United States Patent
Handwerker et al.

(10) Patent No.: US 9,263,166 B2
(45) Date of Patent: Feb. 16, 2016

(54) SHELL ACTIVATED SINTERING OF CORE-SHELL PARTICLES

(71) Applicants: Carol Anne Handwerker, West Lafayette, IN (US); Suk Jun Kim, West Lafayette, IN (US); Eric A. Stach, West Lafayette, IN (US)

(72) Inventors: Carol Anne Handwerker, West Lafayette, IN (US); Suk Jun Kim, West Lafayette, IN (US); Eric A. Stach, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 108 days.

(21) Appl. No.: 13/919,175

(22) Filed: Jun. 17, 2013

(65) Prior Publication Data

US 2014/0370322 A1    Dec. 18, 2014

Related U.S. Application Data

(62) Division of application No. 12/877,132, filed on Sep. 8, 2010, now abandoned.

(60) Provisional application No. 61/240,441, filed on Sep. 8, 2009.

(51) Int. Cl.
| | |
|---|---|
| H01G 7/00 | (2006.01) |
| H01B 1/02 | (2006.01) |
| B22F 1/00 | (2006.01) |
| B22F 1/02 | (2006.01) |
| B22F 3/12 | (2006.01) |
| C22C 1/04 | (2006.01) |
| B82Y 30/00 | (2011.01) |

(52) U.S. Cl.
CPC ............... *H01B 1/02* (2013.01); *B22F 1/0018* (2013.01); *B22F 1/025* (2013.01); *B22F 3/12* (2013.01); *B82Y 30/00* (2013.01); *C22C 1/0425* (2013.01); *Y10T 428/12014* (2015.01)

(58) Field of Classification Search
CPC .... C04B 35/46; C04B 35/495; C04B 35/465; C04B 35/4682; C04B 2235/3215; C04B 2235/3212; C04B 2235/3224; H01G 4/30; H01G 5/06; H01G 13/00
USPC ...................... 501/134–137; 29/25.42, 25.41; 361/321.4, 321.2, 311, 323, 508
See application file for complete search history.

(56) References Cited

U.S. PATENT DOCUMENTS

| | | | | |
|---|---|---|---|---|
| 4,826,727 | A * | 5/1989 | Glaser | ........................... 428/403 |
| 8,561,271 | B2 * | 10/2013 | Chai et al. | ..................... 29/25.42 |

(Continued)

*Primary Examiner* — Noah Wiese
(74) *Attorney, Agent, or Firm* — Taft Stettinius & Hollister LLP; Anthony P. Filomena, II

(57) ABSTRACT

A sintered structure and method for forming it are disclosed. The method includes obtaining core-shell particles having a core material and a shell material, forming the particles into a powder compact, and annealing the powder compact at an annealing temperature. The shell material is a metal that diffuses faster than the core material at the annealing temperature and diffuses to the contacts between the core-shell particles during annealing to form sintered interfaces between the core-shell particles. The sintered structure can have discontinuous regions of shell material between the sintered interfaces. The core material can be a metal, semiconductor or ceramic. The core material can be copper and the shell material can be silver. The sintered interfaces can be almost purely shell material. The annealing temperature can be significantly lower than the temperature needed to form interfaces between particles of the core material without the shell material.

20 Claims, 8 Drawing Sheets

(56) References Cited

U.S. PATENT DOCUMENTS

2011/0310528 A1* 12/2011 Chai et al. ................. 361/321.1
2011/0318213 A1* 12/2011 Handwerker et al. ........... 419/10
2012/0262836 A1* 10/2012 Chai .......................... 361/301.4

* cited by examiner

| | Cu compact before annealing | Cu compact after annealing | Cu-Ag compact before annealing | Cu-Ag compact after annealing |
|---|---|---|---|---|
| Relative density | 0.53±0.01 | 0.56 | 0.50±0.01 | 0.70 |
| Cu grain size (nm) | 89±9 | 114±14 | 107±5 | 104±5 |
| Ag grain size (nm) | - | - | ** | 23±3 |

SHELL ACTIVATED SINTERING OF CORE-SHELL PARTICLES

CROSS-REFERENCE TO RELATED APPLICATIONS

This application is a divisional of U.S. patent application Ser. No. 12/877,132, filed on Sep. 8, 2010, entitled "Shell Activated Sintering of Core-Shell Particles," which claims priority to U.S. Provisional Patent Application Ser. No. 61/240,441, filed on Sep. 8, 2009, entitled "Shell Activated Sintering of Core-Shell Particles," the disclosures of which are all incorporated herein by reference.

GOVERNMENTAL SUPPORT INFORMATION

This invention was made with government support under grant/contract number NSF 0727960 awarded by the National Science Foundation; and under grant/contract number AFRL FA8650-08-C-5510 awarded by the Air Force Research Laboratory. The Government has certain rights in the invention.

BACKGROUND AND SUMMARY

The present invention relates to sintering of core-shell metal, semiconductor, and ceramic powders to form structures and porous films.

With the European Union and Chinese bans of Lead-Tin (Pb—Sn) eutectic solder for electronic interconnects, the microelectronics research community has been examining a range of possible Pb-free alternatives for interconnection, even non-solder based technologies. The dominant Pb-free solders currently used in high-volume consumer electronics are near eutectic Tin-Silver-Copper (Sn—Ag—Cu or SAC) alloys, with some use of Sn—Cu alloys with ternary additions to modify wetting and interactions with substrate materials. Although consumer electronics have transitioned almost entirely to Pb-free solder interconnects, their poorer drop/impact behavior compared with Sn—Pb eutectic, their higher processing temperatures (240° C.) relative to Sn—Pb eutectic (220° C.), their highly anisotropic solidification, thermal expansion, and mechanical behavior, and their propensity to spontaneously form tin whiskers have left the microelectronics industry looking for improved interconnect solutions.

The electronics industry is searching for alternatives to tin-lead and lead-free solder alloys for board level interconnection, flip-chip and other area array interconnections, thermal interface materials, and die attach materials. Sintering of Cu—Ag core shell particles is an exemplary embodiment disclosed herein for these applications. The sintered Cu—Ag does not form tin whiskers, a reliability risk for lead-free solders, because the interconnect material Cu—Ag does not contain tin. The Cu—Ag core-shell particles are more mechanically and chemically compatible than solder with Cu board pads and traces and with metal leads and lead-less interconnects on the components.

The printed electronics industry is searching for a method to create more dimensionally stable, more corrosion resistant, and cheaper metallic interconnections than pure Ag nanoparticles. The printed electronics industry is also searching for a method to create sintered semiconductor layers at temperatures far below those required to sinter semiconductor particles without the shell. Embodiments disclosed herein include a breakup of the metal shell into isolated metal particles which produces structures that behave electrically as a semiconductor and not a metal. This approach can work for amorphous semiconductor powders as well as crystalline powders.

Embodiments disclosed herein can also benefit the sensor industry by allowing for the joining of higher temperature sensor materials with fast diffusing shell materials. Embodiments disclosed herein can also benefit other industries which require assembly of particles to form continuous structures at temperatures where the core particles do not sinter.

A solderless nanotechnology based on low temperature sintering is disclosed with exemplary embodiments of Cu—Ag core-shell nanoparticles to form porous interconnections that have the potential to replace traditional solder joints as well as high-Pb and Au-containing solder alloys used for high temperature die attach of semiconductor devices. For Cu—Ag core-shell particles, Ag diffusion from the particle surfaces to particle-particle contacts during heating leads to enhanced interparticle sintering compared with uncoated Cu nanoparticles. Microstructural, thermal and electrical characteristics of the sintered structures indicate that Cu—Ag core-shell sintering may be a viable route to a solderless alternative to Pb-free solders with a joint formation temperature less than or equal to Sn—Pb eutectic.

Enhanced sintering of Cu—Ag core-shell nanoparticles was observed to occur by fast diffusion of Ag at 220° C. from particle surfaces, leading to the formation of sintered necks of Ag at the initial particle-particle contacts. In comparison with similar sized pure Cu nanoparticles after annealing and the Cu—Ag nanoparticles before annealing, Cu—Ag particles had higher densities. Transmission electron microscopy (TEM) and energy-filtered TEM shows that the sintered necks were primarily or pure Ag and that the particle surfaces away from the contacts were nearly Ag-free, in contrast to the uniform shell thickness of the as-synthesized Cu—Ag core-shell nanoparticles. The extent of neck formation in the final sintered structure can be controlled by the choice of the initial Ag layer thickness.

A method is disclosed for forming a sintered structure at an annealing temperature. The method includes obtaining core-shell particles having a core material and a shell material, forming the core-shell particles into a powder compact in which the core-shell particles are in physical contact, and annealing the powder compact at the annealing temperature. The shell material is a metal material that diffuses faster than the core material at the annealing temperature and the faster diffusing shell material diffuses to the contacts between the core-shell particles during the annealing to form sintered interfaces between the core-shell particles that are in physical contact. The core material can be a metal, semiconductor or ceramic material. The core material can be copper and/or the shell material can be silver. The sintered interfaces can be almost purely composed of the shell material.

The core material and the shell material can have limited mutual solubility at the annealing temperature. The core material and the shell material can be materials that do not form an intermediate phase between the core and shell materials at the annealing temperature. The annealing temperature can be significantly lower than the temperature needed to form sintered interfaces between particles of the core material without the shell material. The annealing step can be performed in an annealing atmosphere that promotes diffusion of the shell material at the annealing temperature, where the shell material may not be prone to diffuse at the annealing temperature in a standard air atmosphere. The annealing step can be performed long enough to form discontinuous regions of the shell material in the sintered structure between the sintered interfaces. The annealing step can cause an increase in the density of the core-shell particles in the powder compact. The core-shell particles can have an average diameter of approximately 470 nm. The average thickness of the shell material on the core-shell particles can be approximately 7 nm.

A sintered structure is disclosed that includes a sintered core-shell compact made of a plurality of core-shell particles sintered at an annealing temperature, where each of the plurality of core-shell particles has a core material and a shell material, the shell material being a metal material that diffuses faster than the core material at the annealing temperature. The sintered core-shell compact includes a plurality of sintered interfaces between the core-shell particles that are in physical contact. The core material can be copper and/or the shell material can be silver. The core material can be a metal material, a semiconductor material, or a ceramic material. The sintered core-shell compact can be formed so it does not include an intermediate phase material between the core and shell materials. The sintered interfaces may be almost purely composed of the shell material. The sintered core-shell compact can include discontinuous regions of the shell material on the sintered core-shell particles between the sintered interfaces.

DESCRIPTION OF EXEMPLARY EMBODIMENTS

Figures 1, 3:
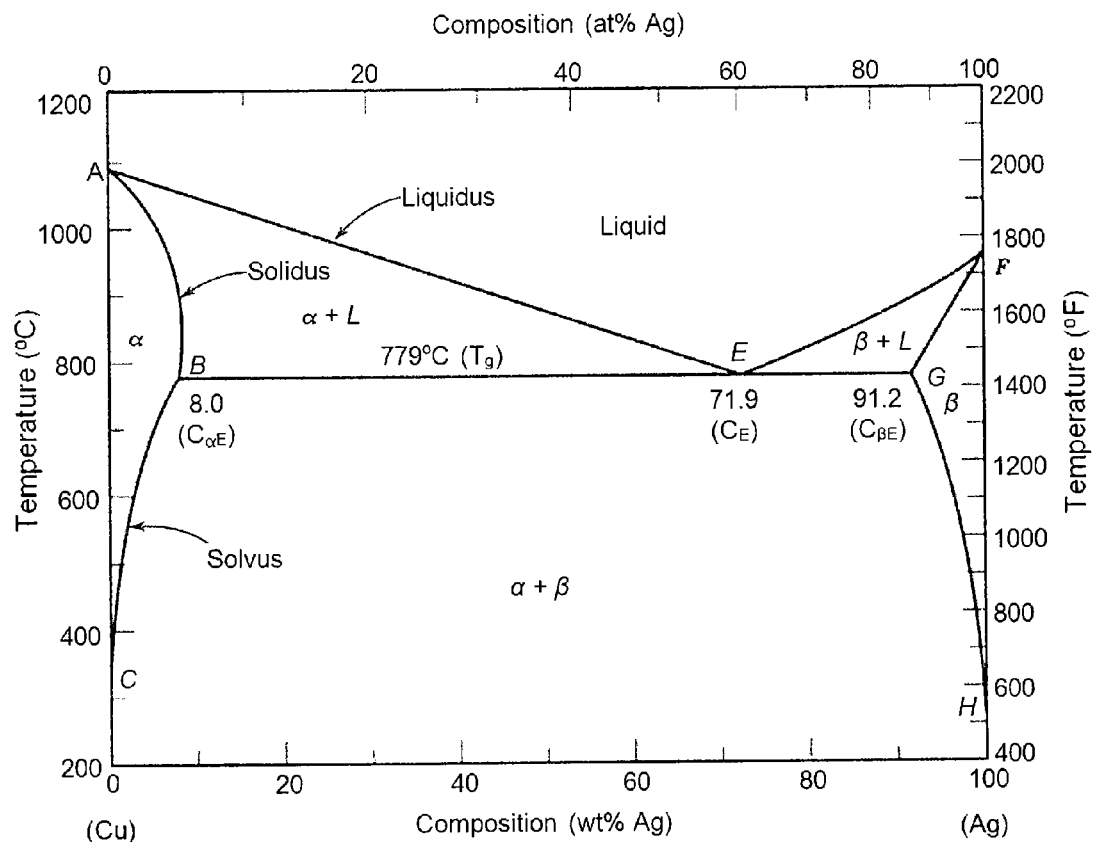
FIG. 1 is an Ag—Cu Phase Diagram which represents the phases and compositions that are at equilibrium for a given composition at a given temperature.
FIG. 3 is a table showing relative densities and grain sizes of the uncoated Cu particles and the Cu—Ag core-shell particles before and after annealing.

For the purposes of promoting an understanding of the principles of the technology, reference will now be made to the embodiments described herein and illustrated in the drawings and specific language will be used to describe the same. It will nevertheless be understood that no limitation of the scope of the technology is thereby intended, such alterations and further modifications in the illustrated devices and methods, and such further applications of the principles of the technology as illustrated therein being contemplated as would normally occur to one skilled in the art to which the technology relates.

Embodiments of the invention disclosed herein provide an improved method of sintering metal, semiconductor, and ceramic powders. Sintering of nanoscale and microscale particles can be enhanced by the formation of a shell of a different phase on the particles. The shell material can be chosen so that it diffuses faster at the temperatures of interest than the base particles that are to be joined, has limited mutual solubility, and does not form an intermediate phase between the core and shell phases.

A nanometer scale shell can be applied to the core particles of metal, semiconductor, or ceramic. The core-shell particles can be assembled into a powder compact in which the powder particles are in physical contact. When the core-shell particles are heated in the powder compact, the faster diffusing shell material diffuses to the contacts between the core-shell particles and forms a sintered neck of almost pure shell material. In comparison with similar sized nanoscale or microscale particles of the pure core material, there is significantly more sintering and therefore more physical interconnection between the particles. The extent of neck formation can be controlled by the fast diffusing shell material chosen, the size of the core particles, the shell thickness, the grain structure within the core particles and any epitaxial relationship that exists between the core and shell material. The extent of neck formation can also be controlled by the annealing temperature, the annealing atmosphere, and the annealing time.

The degree of interconnection increases with increasing initial density of the compact and with increasing number of particle-particle contacts in the initial unsintered structure. The process can be designed such that all of the shell material will either diffuse to the particle-particle contracts or will dewet the core particle surfaces leaving discontinuous regions of the shell material.

Figure 6:
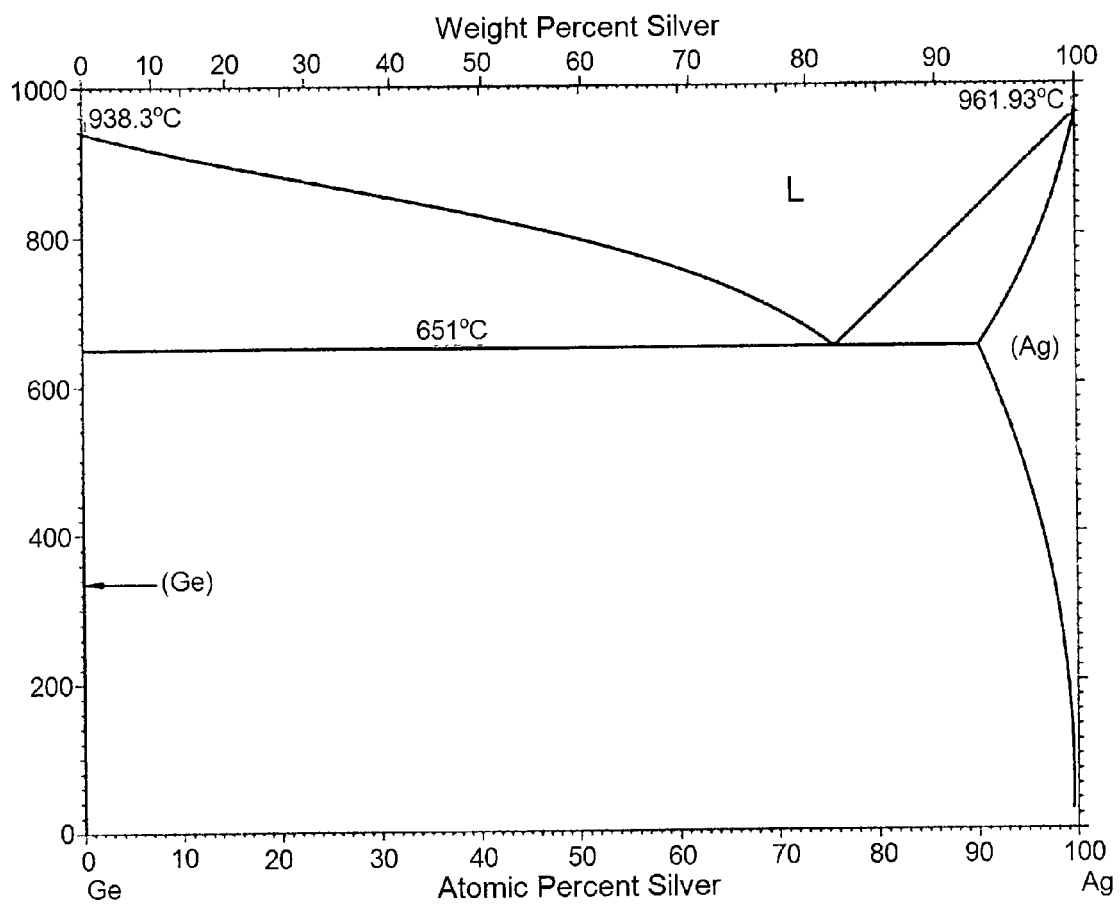
FIG. 6 is an Ag—Ge Phase diagram which represents the phases and compositions that are at equilibrium for a given composition at a given temperature.

The process takes advantage of simple eutectic systems, such as copper-silver (Cu—Ag), germanium-silver (Ge—Ag), silicon-silver (Si—Ag), silicon-tin (Si—Sn), germanium-gold (Ge—Au), tin dioxide-silver (SnO$_2$—Ag), and zinc oxide-silver (ZnO—Ag), in which the two elemental materials do not form any intermetallic solid phases. Examples of this are shown in the phase diagrams for Ag and Cu in FIG. 1, and for Ag and Ge in FIG. 6. The following description provides details on exemplary metal core-metal shell (Cu—Ag) particles; however it will be clear to someone of skill in the art that the teaching can also be applied to particles with a semiconductor or ceramic core and a metal shell.

The process can also take advantage of situations where the solubility of the shell phase in the core phase is very low, but the solubility of the core phase in the shell phase may be slightly higher. The process can also take advantage of situations where the shell atoms diffuse faster than the core atoms at the annealing temperatures.

The two materials may be brought into contact in different geometries. The metal, as either a continuous film or as nanoscale powder particles, can form a nanoscale polycrystalline shell around the core particle. The core powder particles may be nanoscale or microscale. The core-shell powder particles may then be formed into a powder-based structure by a variety of techniques, including but not limited to ink jet printing, other spray-based techniques where either the powder is sprayed or a binder is sprayed onto a powder bed, tape-casting, dry pressing, warm pressing or hot pressing.

The core particles can also be formed into a powder-based structure by a variety of liquid-based techniques, including but not limited to ink-jet printing, other spray-based techniques where either the powder is sprayed or a binder is sprayed onto a powder bed, or tape-casting. The liquid can contain the precursors for the shell metal phase which then precipitates out as the liquid evaporates. It may be desirable for the shell metal phase to precipitate at the core-core particle contacts.

The powder particle structures can be heated to a temperature at which diffusion of the shell metal atoms is sufficiently fast to produce shape changes in the metal core particles and the metal shell and leads to the formation of a sintered interface between two touching core particles. This interface formed by sintering is typically referred to as a sintered "neck." The temperatures where this occurs can be significantly lower than the temperatures required to make equivalent core-core interfaces without the metal shell.

The application and combination of these concepts can be used to form sintered structures from powders that originally contained both nanoscale metals as a shell and nanoscale or microscale metal core particles, and can be performed at low temperatures relative to the temperatures needed to sinter the core particles in the absence of the metal shell.

This process has been demonstrated with silver (Ag) shells on copper (Cu) core particles in the nanoscale and in the microscale range. The Ag—Cu phase diagram is shown in FIG. 1. There is low solubility of Ag in Cu at temperatures below 400° C., and low solubility of Cu in Ag at temperatures below approximately 250° C.

Core-shell particles with Cu (copper) cores and Ag (silver) shells and pure, uncoated Cu core particles were obtained. Nanoparticles of Cu were fabricated and then coated with Ag to form core-shell Cu—Ag (10 wt % Ag) nanoparticles. Based on scanning electron microscope (SEM) particle measurements of 200 particles of each particle type, the particle diameters of the Cu particles were 460±110 nm and the particle diameters of the Cu—Ag core-shell particles were 470±110 nm. The calculated Ag shell thickness was approximately 7 nm with an assumption of 470 nm diameter spherical particles and uniform shell thickness.

Pressed powder compacts (1g) were formed from each of the particle types using a ¾inch-diameter die under a pressure of 78 MPa for 30 seconds. The resulting porous compacts were inverted within the die and pressed once more under the same pressure for the same duration. The compacts were annealed at 220° C. for 10 minutes in an argon atmosphere. Compact density before and after sintering was determined using measurements of the dimensions of the compacts. The average grain size was determined by x-ray diffraction (XRD, Bruker D8 Focus) measurements via Scherrer's formula using the (111) peaks of Ag and Cu with the peak width calibrated with the $Al_2O_3$, NIST standard reference material (NIST SRM 676a). The microstructures of particle-particle contacts were determined from fracture surfaces examined by scanning electron microscopy (SEM-Hitachi S-4800). FIG. 2 shows scanning electron microscope (SEM) cross-sectional images of the compacts before and after annealing at 220° C. The scale bar in FIG. 2(c), which applies to all of FIGS. 2(a)-(d), is 1 μm.

Figure 2A:
FIG. 2(a) is a scanning electron micrograph of uncoated Cu particles formed into a powder compact before annealing.
Figure 2B:
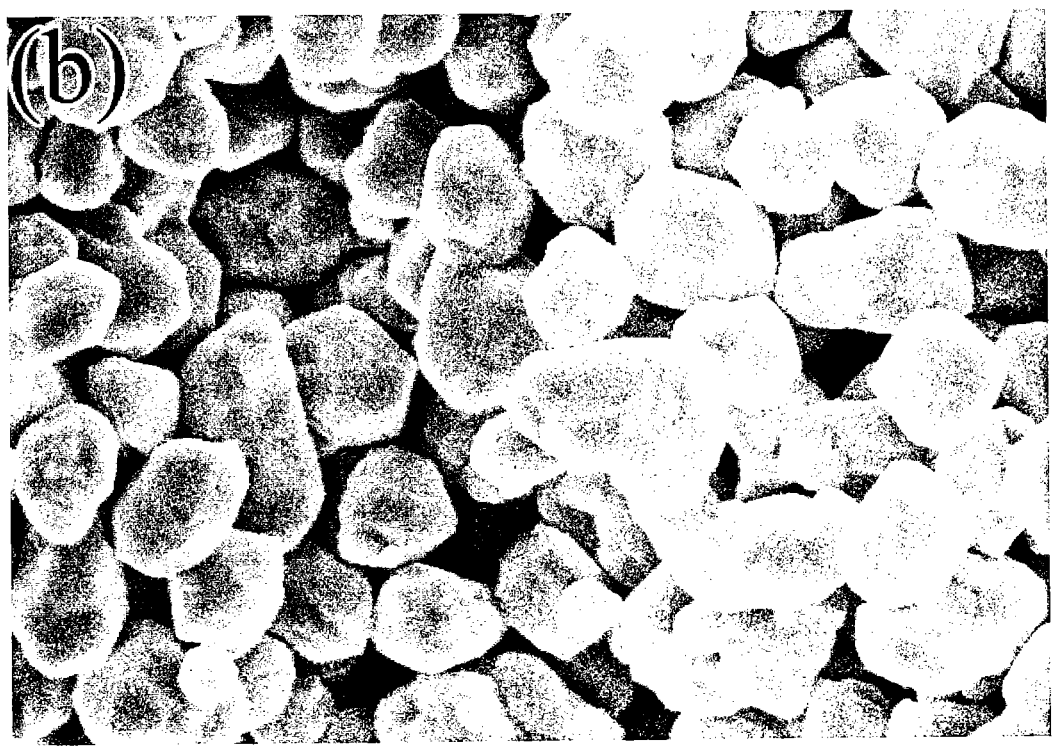
FIG. 2(b) is a scanning electron micrograph of uncoated Cu particles in the powder compact after annealing at 220° C. for 10 minutes.

A SEM micrograph of the as-received, uncoated Cu particles formed into a powder compact is shown in FIG. 2(a). A scanning electron microscope micrograph of uncoated Cu particles in the powder compact after annealing at 220° C. for 10 minutes is shown in FIG. 2(b). The micrograph of uncoated Cu particles after annealing shows no detectable neck formation.

Figure 2C:
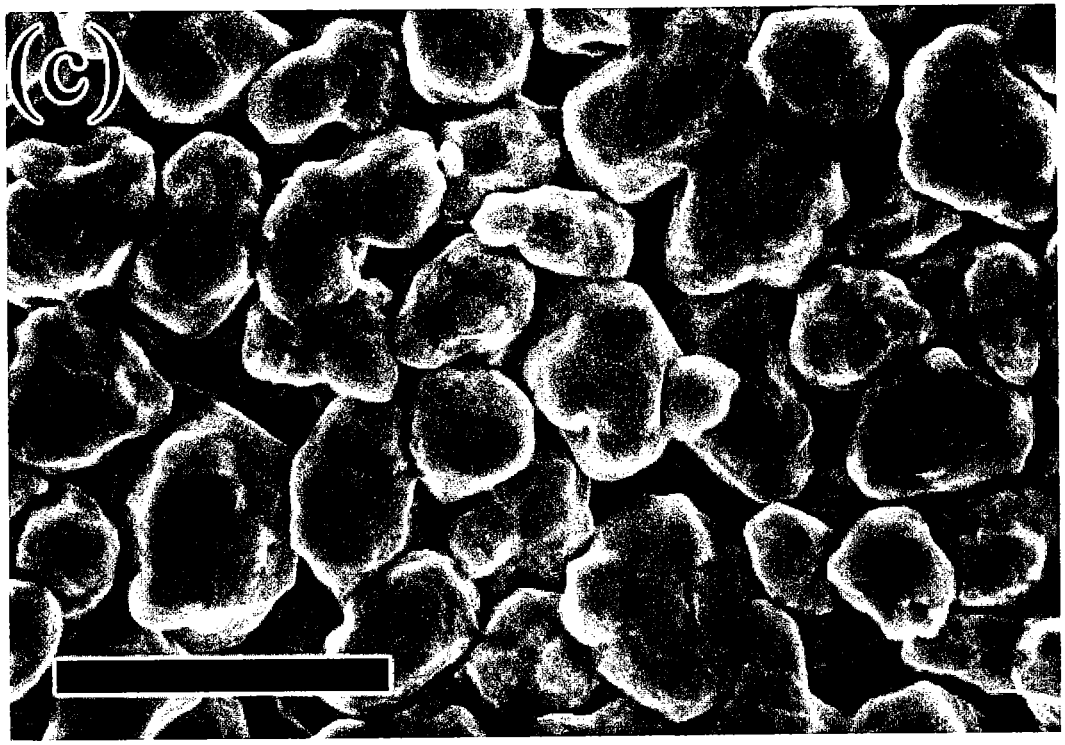
FIG. 2(c) is a scanning electron micrograph of Cu—Ag core-shell particles formed into a powder compact before annealing.
Figure 2D:
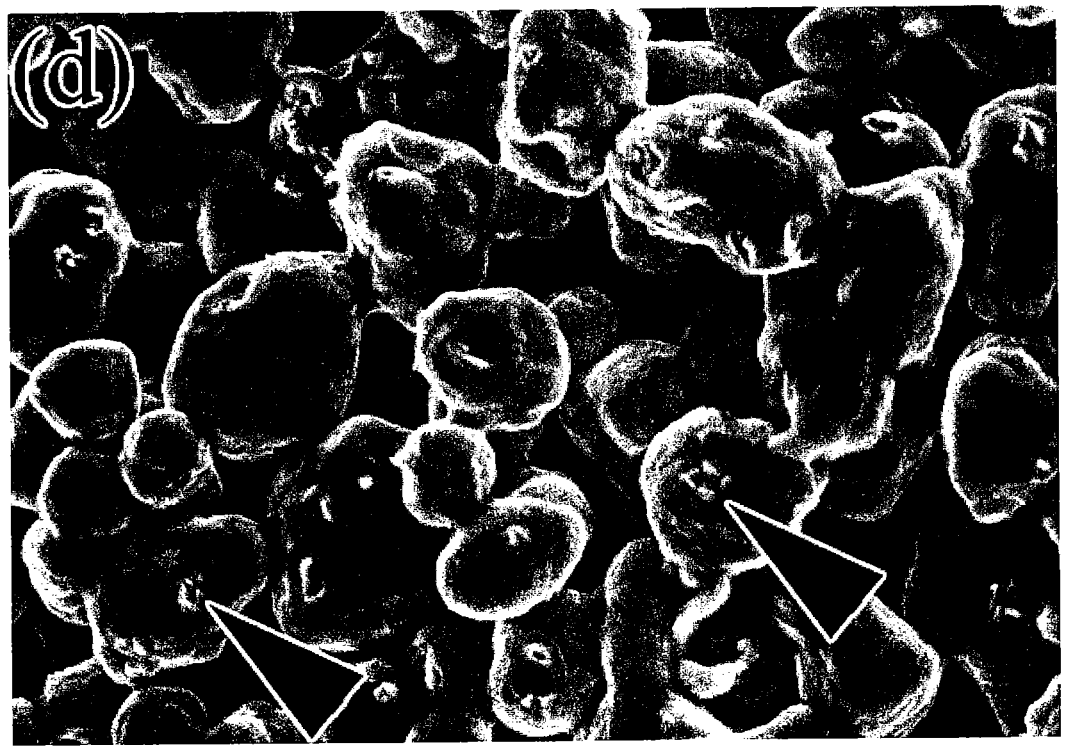
FIG. 2(d) is a scanning electron micrograph of Cu—Ag core-shell particles in the powder compact after annealing at 220° C. for 10 minutes with arrows indicating fractured necks which are evidence of sintering.

A scanning electron microscope micrograph of the as-received Cu—Ag core-shell particles formed into a powder compact is shown in FIG. 2(c). A scanning electron microscope micrograph of the Cu—Ag core-shell particles in the powder compact after annealing at 220° C. for 10 minutes is shown in FIG. 2(d). The micrograph of the Cu—Ag core-shell particles after annealing shows neck formation as evidenced from the fractured necks. The arrows in FIG. 2(d) indicate fractured necks which are evidence of sintering.

From examination of the fracture surfaces, the pure Cu compacts showed no appreciable interparticle contact formation for either the as-received particles or after annealing at 220° C. For the Cu—Ag nanoparticles, powder compacts of the as-received nanoparticles showed occasional interparticle contact formed during the Ag deposition process. However, after annealing at 220° C., a significant number of interparticle contacts were evident from the occurrence of fractured 'necks', where particle-particle sintering had occurred FIG. 3 summarizes the effects of interparticle sintering on the density and grain size of the Cu and Ag particles as estimated from x-ray diffraction. FIG. 3 shows relative density and grain size comparisons between the uncoated Cu particles and the Cu—Ag core-shell particles before and after annealing of the powder compacts at 220° C. Because the measurement error in the compact thickness is lower than the error in diameter, the density of compacts before annealing was calculated based on physical measurement while the density of compacts after annealing was calculated with the volume estimated using the following relationship between volume shrinkage and linear shrinkage where V is volume and L is pellet thickness:

$$\frac{\Delta V}{V_0} = 1 - \left(1 - \frac{\Delta L}{L_0}\right)^3$$

The table of FIG. 3 shows an increase in density for the Cu—Ag core-shell particles after annealing. These measurements indicate that densification and Ag grain growth occurred in the Cu—Ag particle compacts while little densification was observed in the pure Cu pellet. There was no apparent change in the Cu grain size within the Cu—Ag particles with annealing. However, it should be noted that full width at half maximum (FWHM) of XRD peak of Ag before annealing was unmeasurable due to its low intensity. After annealing, the intensity of the Ag XRD peaks increased due to the formation of sintered Ag necks at particle-particle contacts, leading to a calculated Ag grain size of 23 nm. The "**" symbol in FIG. 3 indicates that the Ag peak intensity is too low for analysis before annealing.

The above data indicates that there is a significant difference between the sintering behavior of the pure Cu and the Cu—Ag core-shell nanoparticles. Transmission electron microscopy (TEM) and energy-filtered TEM (EFTEM) were used to investigate the effect of the Ag layer on interparticle sintering and to determine the microstructural origins of the sintering response. Samples for transmission electron microscopy were prepared in the following manner. Epoxy (Allied, EpoxyBond 110™) was applied to the surface of the un-annealed and annealed compacts, allowed to infiltrate the pores, and was cured at 130° C. for 10 min in air. The compacts were cut into 3 mm discs, attached to a TEM hole grid, ground to a thickness of 100 μm, and polished with a dimple grinder (Gatan Model 656 Dimple Grinder). The resulting samples were ion-milled using a Gatan 691 precision ion polishing system (PIPS) at liquid nitrogen temperature, analogous to conventional bulk TEM sample preparation methods. Characterization by TEM and energy-filtered TEM was performed using an FEI Titan 80/300.

FIG. 4 includes TEM and EFTEM images of the Cu—Ag particle compact before annealing. FIG. 4(a) is a bright field TEM image of the Cu—Ag core-shell particles before annealing. The spatial distribution of Ag and Cu was investigated using EFTEM. FIG. 4(b) is an Ag jump ratio map image of the area shown in FIG. 4(a). The Ag jump ratio map was obtained using a 20 eV energy-selection slit, with a slit position of 367 eV for the pre-edge image and 410 eV for the post-edge image and an exposure time of 30 seconds. FIG. 4(c) is a Cu elemental map of the area shown in FIG. 4(a). The Cu elemental map was obtained using two pre-edge windows (centered at 865 and 895 eV) and a post-edge window centered at 970 eV, each with a 30 eV slit width and an exposure time of 30 seconds. Because the low concentration of Ag results in a noisy image, the Ag layer was characterized using the jump ratio map technique instead of the elemental map technique.

Figure 4A:
FIG. 4(a) is a bright field transmission electron micrograph (TEM) image of the Cu—Ag core-shell particles before annealing.
Figure 4B:
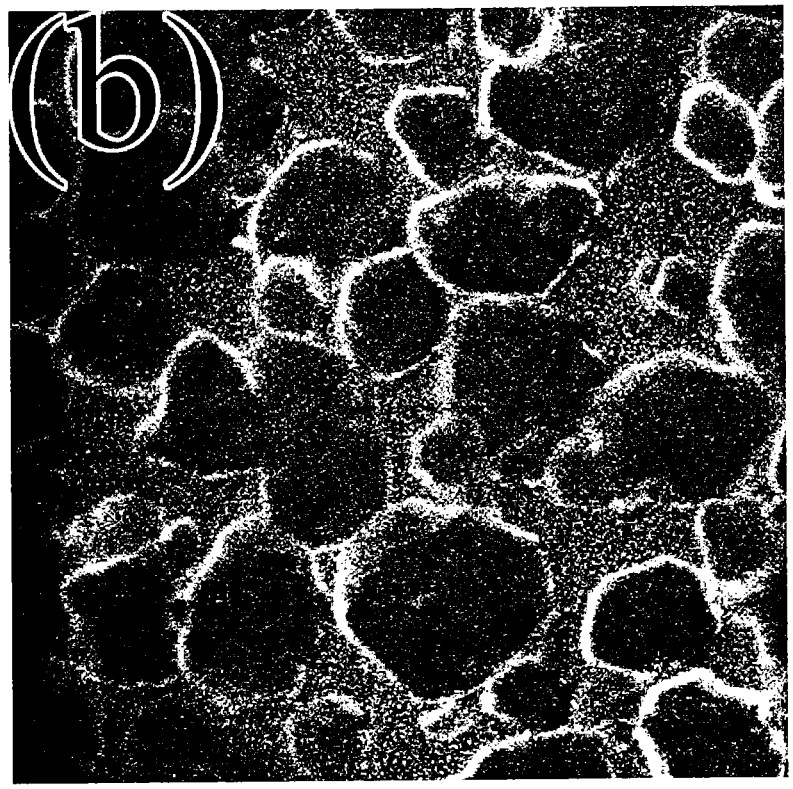
FIG. 4(b) is an Ag jump ratio map image of the area shown in FIG. 4(a) obtained using a 20 eV energy-selection slit, with a slit position of 367 eV for the pre-edge image and 410 eV for the post-edge image and an exposure time of 30 seconds.
Figure 4C:
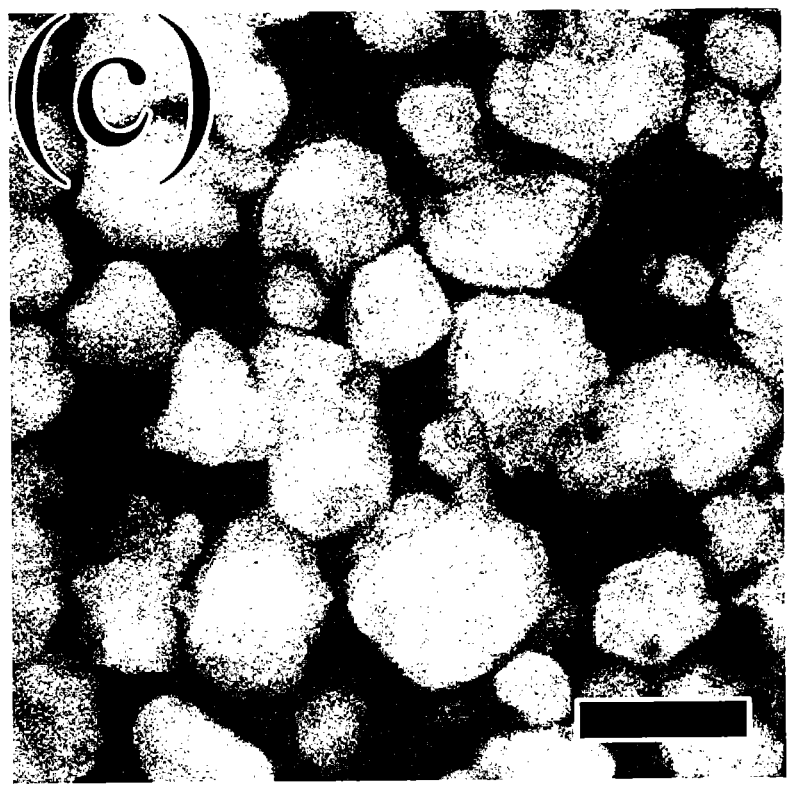
FIG. 4(c) is a Cu elemental map image of the area shown in FIG. 4(a) obtained using two pre-edge windows centered at 865 and 895 eV and a post-edge window centered at 970 eV, each with a 30 eV slit width and an exposure time of 30 seconds.
Figure 4D:
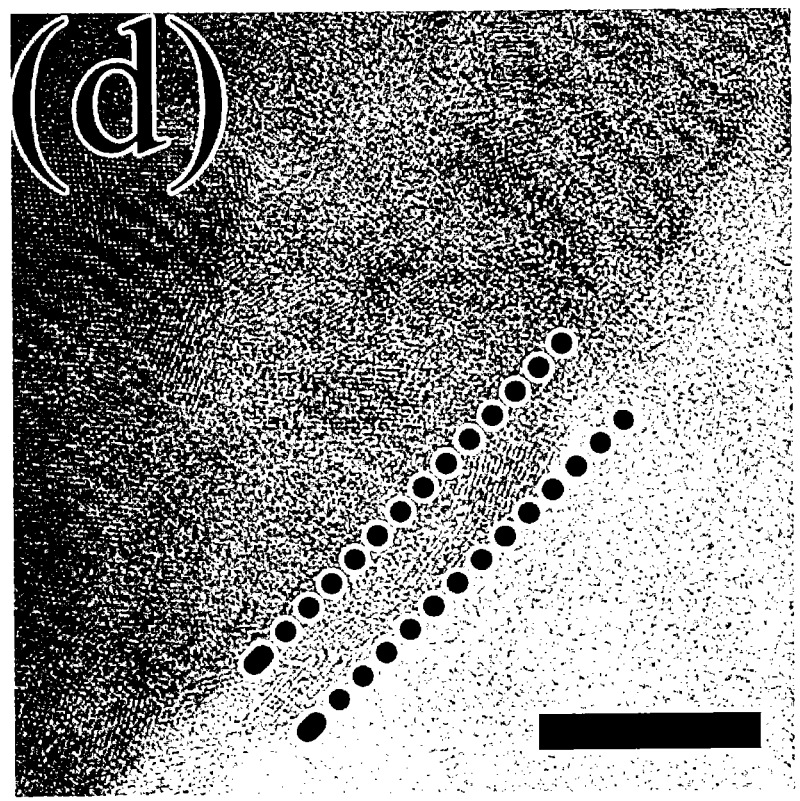
FIG. 4(d) shows a Cu—Ag core-shell particle surface area at high magnification with the Ag shell layer indicated by two parallel dotted lines.

As shown FIG. 4(b), the Cu—Ag particles are coated with a relatively uniform Ag layer prior to annealing. The Cu elemental map in FIG. 4(c) precludes the possibility that the contrast in FIG. 4(b) was caused by a mismatch of pre-edge and post edge images for diffraction contrast from thickness or crystal orientation differences. FIG. 4(d) shows a particle surface area at high magnification. The scale bar in FIGS. 4(a)-(c) is 500 nm, and the scale bar in FIG. 4(d) is 10 nm. In FIG. 4(d), the Ag layer is indicated by two parallel dashed lines. The higher magnification image of FIG. 4(d) supports this interpretation, as the Ag layer exhibits a difference in contrast related to its different composition and crystalline orientation. In cross-section, the apparent Ag shell thickness depends on which part of the particle was cross-sectioned: for section planes away from the center of a core-shell particle, the apparent Ag shell thickness increases as the section plane approaches the particle edge, even for a uniformly coated particle. The average thickness of the Ag shell was estimated by TEM from measurements of cross sections of particles whose diameters were close to the average particle (470 nm). The measured thickness was 8±3 nm (N=50) which is comparable to 7 nm, the calculated value.

FIG. 5 includes TEM and EFTEM images of the Cu—Ag particle compact after annealing to examine the effect of Ag diffusion on interparticle sintering. FIG. 5(a) is a bright field TEM image which indicates both enhanced interparticle sintering and a less facetted morphology following annealing compared with the similar pre-annealing image of FIG. 4(a). FIG. 5(b) is an Ag jump ratio map image of the area shown in FIG. 5(a), and FIG. 5(c) is a Cu elemental map of the area shown in FIG. 5(a). FIGS. 5(b) and 5(c) were obtained using the same procedures as FIGS. 4(b) and 4(c), respectively. FIG. 5(d) is an Ag ratio map of the white box area indicated in FIG. 5(a). The scale bar in FIGS. 5(a)-5(c) is 300 nm, and the scale bar in FIG. 5(d) is 100 nm.

Figure 5A:
FIG. 5(a) is a bright field TEM image of the Cu—Ag core-shell particles after annealing.
Figure 5B:
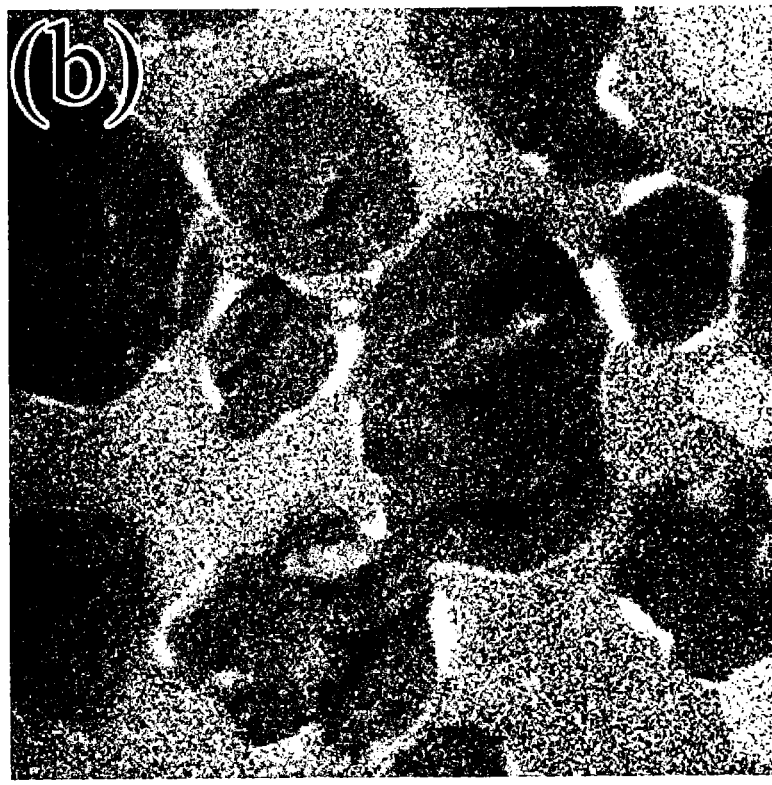
FIG. 5(b) is an Ag jump ratio map image of the area shown in FIG. 5(a) obtained using the same procedures as FIG. 4(b)
Figure 5C:
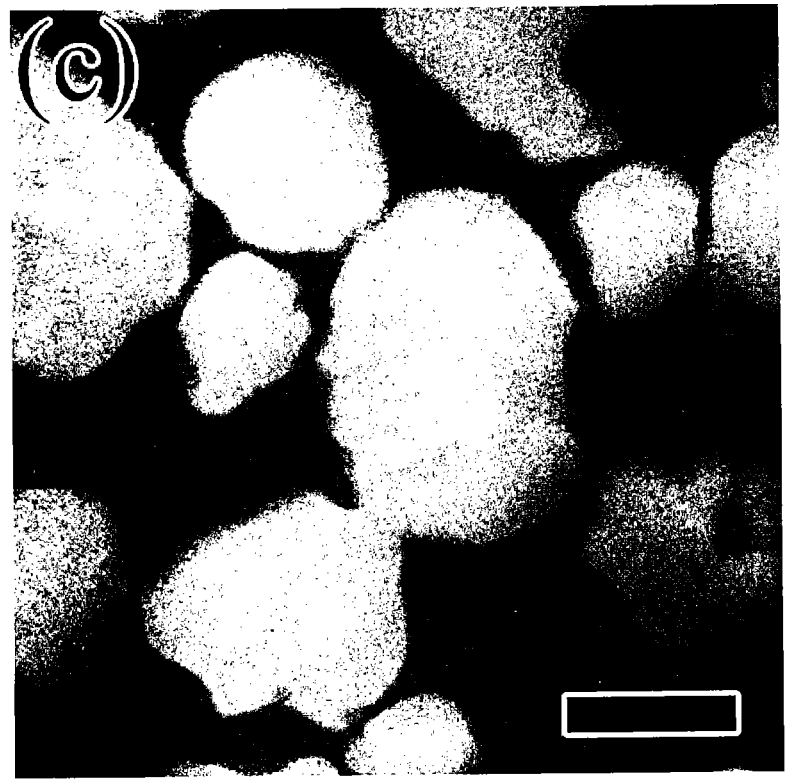
FIG. 5(c) is a Cu elemental map image of the area shown in FIG. 5(a) obtained using the same procedures as FIG. 4(c)
Figure 5D:
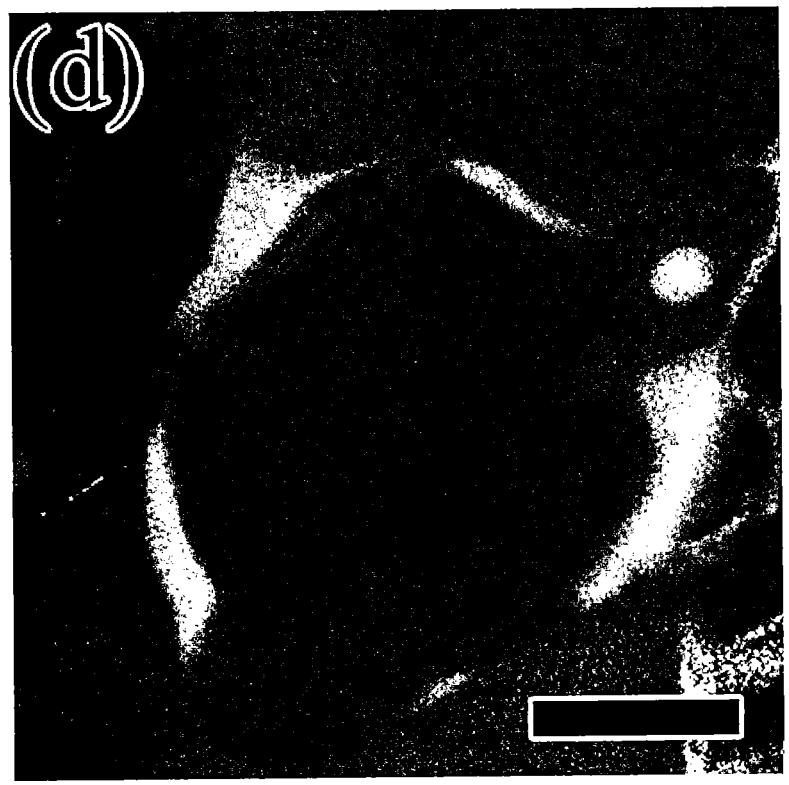
FIG. 5(d) is an Ag ratio map of the white box area indicated in FIG. 5(a)

The EFTEM images of FIGS. 5(b)-(d) demonstrate that the Ag that was originally present in the shell of the core-shell nanoparticles has diffused from the surfaces to the particle-particle contacts. The observation of neck formation by Ag diffusion and segregation during interparticle sintering at temperatures as low as 220° C. with little interdiffusion is consistent with the low solubility of Ag in Cu and Cu in Ag at these temperatures as reported in the Ag—Cu binary phase diagram of FIG. 1 and with the reported Ag surface self diffusion coefficients. For larger Cu—Ag core-shell particles with thicker shell layers, similar neck formation is observed but for the annealing temperatures, times, and atmospheres examined the Ag shells did not become discontinuous. Sintering can be stopped before all Ag has diffused to the particle necks and before the Ag shell becomes discontinuous. The extent of neck formation and whether the remaining shell is continuous or discontinuous depends on the core particle size, initial shell thickness, the annealing temperature, time, and atmosphere.

Sintering at particle-particle contacts can be driven by chemical potential differences from regions of net positive curvature to regions of net negative curvature. The presence of particle-particle contacts can lead to preferential diffusion of Ag to form the observed sintered necks or interfaces. There are several mechanisms that may operate during solid-state sintering of crystalline materials that lead to coarsening without a change in density (e.g., surface diffusion, evaporation/condensation, and lattice diffusion from the free surfaces to the particle-particle contact) and densification (e.g., grain boundary diffusion and lattice diffusion from the grain boundary to the particle surfaces). As shown in FIG. 3, the density of Cu—Ag nanoparticle compacts increased, which leads to the conclusion that Ag transport by surface diffusion and transport by one of the mechanisms that leads to densification may both be operating in this system. In comparison, the pure Cu nanoparticles showed no neck formation by SEM and no significant densification from dimensional changes.

Surface self-diffusion of Ag is extremely sensitive to oxygen adsorption, annealing atmosphere and for Ag nanoparticles to the presence of the capping layer. Using a simple linear diffusion analysis, the fast diffusion of Ag observed here at 220° C. in argon is significantly faster than the surface self-diffusion coefficients of Ag in air but slower than the surface self-diffusion coefficients obtained from measurements in hydrogen. This suggests that a change to a more reducing atmosphere may lead to faster sintering at 220° C. or equivalent sintering at lower temperatures.

The results suggest that the sintering of Cu—Ag core-shell nanoparticles may be useful for producing Pb-free solderless interconnects. Substantial neck formation combined with little shrinkage leads to dimensionally stable interconnects. The amount of neck formation can be controlled by the thickness of the initial Ag shell, with the driving force for diffusion controlled by the overall particle size. It is expected that combining the core-shell nanoparticles with a flux to inhibit particle oxidation may lead to even lower sintering temperatures and shorter times for equivalent degrees of neck formation.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A sintered structure comprising:
a sintered core-shell compact comprised of a plurality of core-shell particles sintered at an annealing temperature, each of the plurality of core-shell particles having a core material surrounded by a shell material prior to annealing, the shell material being a metal material that diffuses faster than the core material at the annealing temperature, the shell material being discontinuous in the sintered core-shell compact making the sintered core-shell compact behave electrically as a semiconductor and not a metal;
wherein the sintered core-shell compact includes a plurality of sintered interfaces between the core-shell particles that are in physical contact.

2. The sintered structure of claim 1, wherein the core material is a non-conductive material.

3. The sintered structure of claim 1, wherein the core material is a non-metal material.

4. The sintered structure of claim 3, wherein the core material is a semiconductor material.

5. The sintered structure of claim 3, wherein the core material is a ceramic material.

6. The sintered structure of claim 1, wherein the core material and the shell material have limited mutual solubility at the annealing temperature.

7. The sintered structure of claim 1, wherein the sintered core-shell compact does not include an intermediate phase material formed between the core and shell materials.

8. The sintered structure of claim 1, wherein the sintered interfaces are substantially composed of the shell material.

9. The sintered structure of claim 1, wherein the plurality of core-shell particles have an average diameter of approximately 470 nm with a shell thickness of approximately 7 nm.

10. The sintered structure of claim 1, wherein the annealing temperature is lower than the temperature needed to form sintered interfaces between particles of the core material without the shell material.

11. The sintered structure of claim 1, wherein the shell material is silver.

12. The sintered structure of claim 11, wherein the core material is a non-conductive material.

13. The sintered structure of claim 11, wherein the core material is a non-metal material.

14. The sintered structure of claim 13, wherein the core material is a semiconductor material.

15. The sintered structure of claim 13, wherein the core material is a ceramic material.

16. The sintered structure of claim 11, wherein the core material and the shell material have limited mutual solubility at the annealing temperature.

17. The sintered structure of claim 11, wherein the sintered core-shell compact does not include an intermediate phase material formed between the core and shell materials.

18. The sintered structure of claim 11, wherein the sintered interfaces are substantially composed of the shell material.

19. The sintered structure of claim 11, wherein the plurality of core-shell particles have an average diameter of approximately 470 nm with a shell thickness of approximately 7 nm.

20. The sintered structure of claim 11, wherein the annealing temperature is lower than the temperature needed to form sintered interfaces between particles of the core material without the shell material.

* * * * *